United States Patent [19]

Hirotomi

[11] Patent Number: 5,153,486
[45] Date of Patent: Oct. 6, 1992

[54] ULTRASONIC MOTOR

[75] Inventor: Jun Hirotomi, Tokyo, Japan

[73] Assignee: Seiko Instruments Inc., Japan

[21] Appl. No.: 626,466

[22] Filed: Dec. 12, 1990

[30] Foreign Application Priority Data

Dec. 13, 1989 [JP] Japan .................. 1-324510
Feb. 21, 1990 [JP] Japan .................. 2-40612

[51] Int. Cl.$^5$ .......................................... H01L 41/08
[52] U.S. Cl. .................................. 318/116; 310/316
[58] Field of Search .................. 310/316, 317, 323; 318/116, 118

[56] References Cited

U.S. PATENT DOCUMENTS

| | | | |
|---|---|---|---|
| 4,727,276 | 2/1988 | Izukawa et al. | 310/316 |
| 4,749,896 | 6/1988 | Suzuki et al. | 310/316 |
| 4,888,514 | 12/1989 | Takahashi et al. | 310/316 |
| 4,926,084 | 5/1990 | Furutsu et al. | 310/316 |
| 4,954,742 | 9/1990 | Izukawa | 310/316 |
| 4,998,048 | 3/1991 | Furutsu | 318/116 |
| 5,013,982 | 5/1991 | Sasaki | 318/116 X |

Primary Examiner—Mark O. Budd
Attorney, Agent, or Firm—Bruce L. Adams; Van C. Wilks

[57] ABSTRACT

An ultrasonic motor which has a driving circuit monitoring a current flowing through a piezoelectric element of the ultrasonic motor, shaping and amplifying the current, and feeding back as a control voltage to a voltage-controlled oscillating circuit, whose output is used to generate a drive signal for the ultrasonic motor. This ultrasonic motor driving circuit is provided with a rotation halt detector that detects when the ultrasonic motor stops its rotation. According to an output signal of the rotation halt detector, a reference voltage for the rectification and amplification is variably controlled.

10 Claims, 8 Drawing Sheets

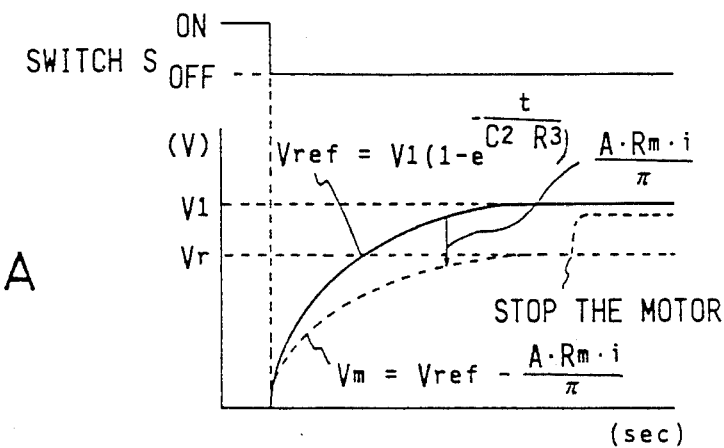
FIG. 7A
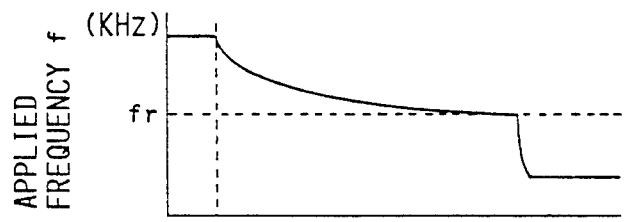
FIG. 7B
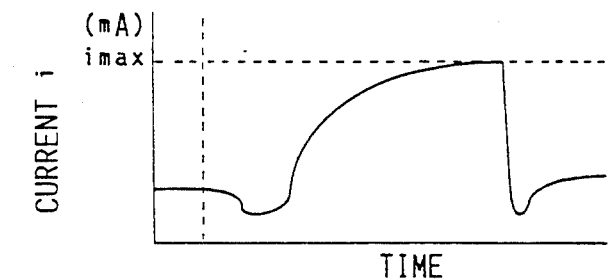
FIG. 7C
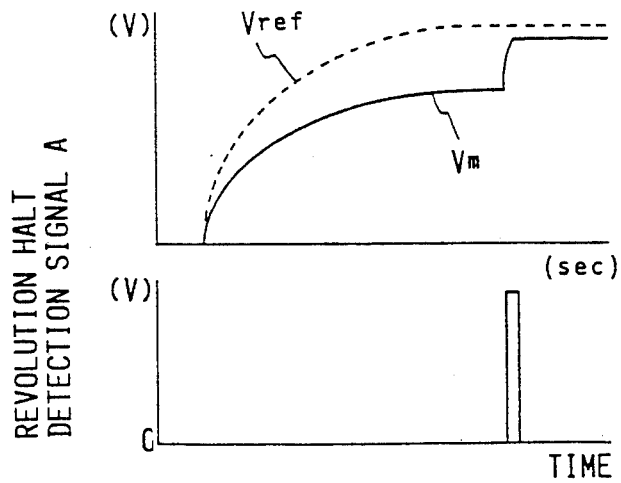
FIG. 8A
FIG. 8B FIG. 11
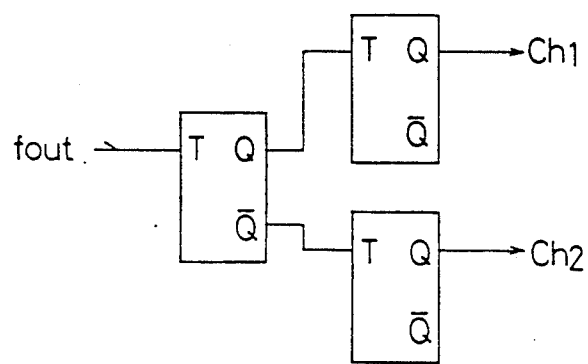
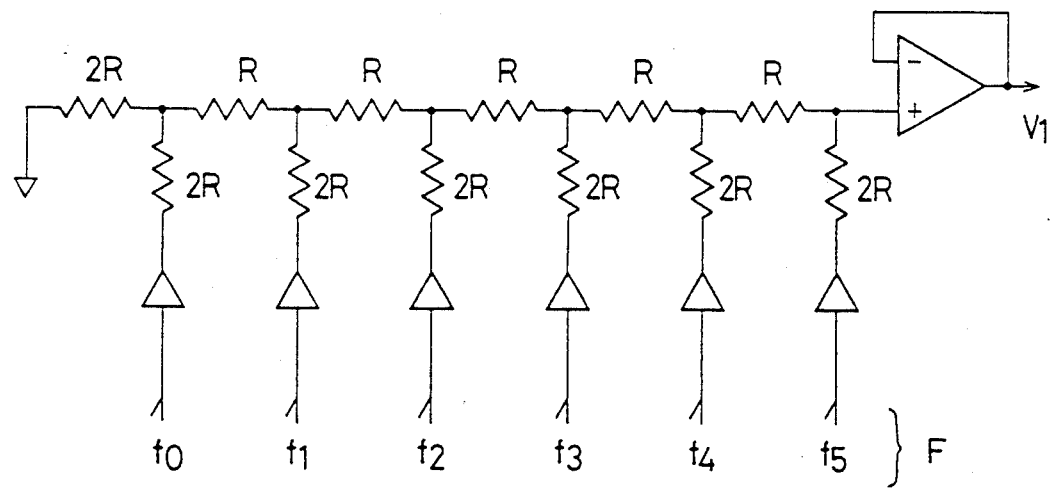
FIG. 12

FIG. 14 A
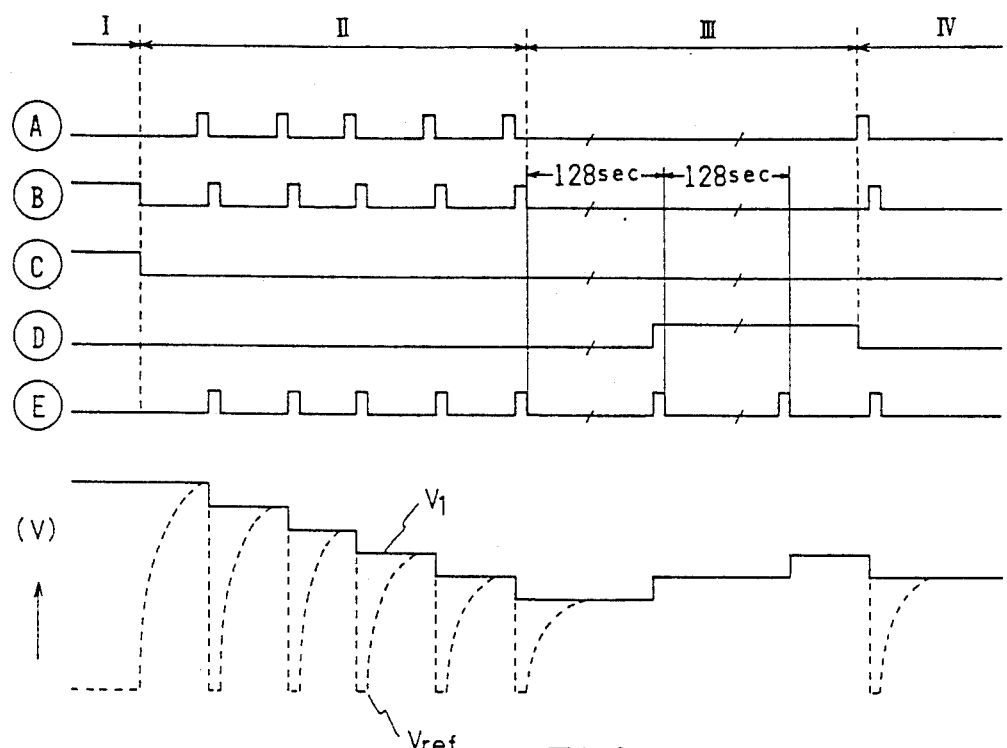
FIG. 14 B
FIG. 15
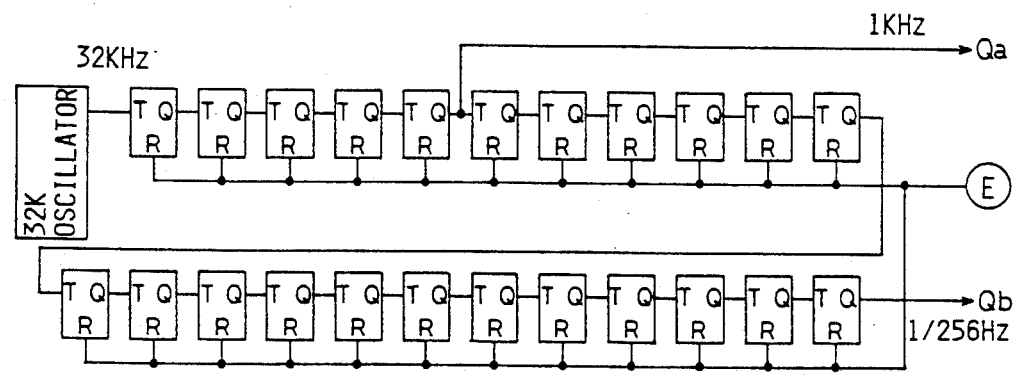

ULTRASONIC MOTOR

BACKGROUND OF THE INVENTION

The present invention relates to an ultrasonic motor which has a driving circuit that utilizes a piezoelectric element.

The ultrasonic motor has an oscillating voltage applied to its piezoelectric element to induce a traveling wave or a standing wave on the surface of a resilient member and thereby drive a moving member which is placed in pressure contact with the resilient member. The frequency of the applied oscillating voltage signal must be equal to or close to a resonance frequency $f_r$ of the ultrasonic motor.

In a conventional type ultrasonic motor, the measurement of the resonance frequency $f_r$ is made beforehand and the drive signal is applied to the ultrasonic motor by means of a reference oscillator.

The conventional method of taking measurement of $f_r$ in advance and using a reference oscillator in producing the drive signal has a problem that forming an oscillator tuned to $f_r$ is not efficient in terms of mass-productivity as there are variations in electrical elements. Secondly, if the drive frequency is fixed by the reference oscillator, any change in $f_r$ and current consumption—which may result from variations in energy loss or heat in the ultrasonic motor itself and from variations in ambient temperatures, contact pressure of the moving member and applied signal amplitude—will bring the ultrasonic motor to a halt.

An ultrasonic motor to stably drive the ultrasonic motor has been filed by this applicant in Japan.

This type of ultrasonic motor makes use of the fact that the current flowing through the piezoelectric element becomes the maximum at the resonance frequency $f_r$ of the motor. That is, a resistor is used to convert the current into a voltage signal, which is rectified and amplified and then fed back as a control voltage to a voltage-controlled oscillator (VCO). A reference voltage for the rectification and amplification is set such that an output frequency of the VCO settles at a frequency close to $f_r$. This method is capable of making the output frequency of VCO follow changes in $f_r$ and current that would result from variations of ambient temperature and applied signal amplitude. The apparatus therefore is suited for a stationary type ultrasonic motor having small load variations. However, when the moving member's contact pressure changes (due, for example, to impacts from falling when the ultrasonic motor is employed in a wristwatch,) causing a sharp change in $f_r$ and current, the VCO output frequency cannot follow such sudden changes, so that there may be cases where the VCO output frequency becomes stabilized at a value deviated from $f_r$, leaving the ultrasonic motor halted. Moreover, since the magnitude of $f_r$ and current changes due to variations in ambient temperature and applied signal amplitude varies from one motor to another, an additional process is required to adjust the follow-up characteristic of individual VCOs.

SUMMARY OF THE INVENTION

The object of the present invention is to provide an ultrasonic motor whose current can be automatically controlled to an optimum value, making the VCO output frequency follow the changed $f_r$, thus allowing restarting of the ultrasonic motor, when the ultrasonic motor is stopped due to changes in $f_r$ and current, which may have resulted from heating of the motor itself and from variations in ambient temperature, moving member's contact pressure and applied signal amplitude, the reference voltage used for rectification and amplification of the ultrasonic motor.

An ultrasonic motor of this invention is provided with a rotation halt detecting means to detect when the ultrasonic motor has stopped its rotation and with a reference voltage control means to control a reference voltage used for rectification and amplification of the current of the ultrasonic motor, so that the apparatus, when it detects the stopping of the ultrasonic motor, can automatically adjust the reference voltage to an optimum value.

BRIEF DESCRIPTION OF THE DRAWINGS

FIGS. 7A, 7B and 7C are diagrams respectively showing how a reference voltage $V_{ref}$, drive frequency and current consumption change after the switch S of FIG. 2 is turned off;

FIG. 8A is a diagram of the reference voltage $V_{ref}$;

FIG. 8B is a diagram showing an ultrasonic motor rotation halt detection signal generated by the rotation halt detector 6 of FIG. 2;

FIG. 11 is a circuit diagram showing one example of a frequency divider used in a driver 5;

FIG. 12 is a circuit diagram showing one example of a reference voltage generator (digital-analog converter) that receives an output signal F (f0 to f5) and generates a reference voltage $V_1$;

FIG. 14A is a timing diagram showing the operation of the up/down counter controller of FIG. 13; and FIG. 14B is a diagram showing reference voltage $V_1$.

FIG. 15 is a circuit diagram showing one example of a reference signal generator 711 in the up/down counter controller 71 of FIG. 13.

DETAILED DESCRIPTION OF THE PREFERRED EMBODIMENT

One embodiment of this invention will be described in the following by referring to the attached drawings. There are various types of ultrasonic motors that use piezoelectric elements, such as standing wave type and traveling wave type. The ultrasonic motor of this invention may be of either type.

Figure 1:
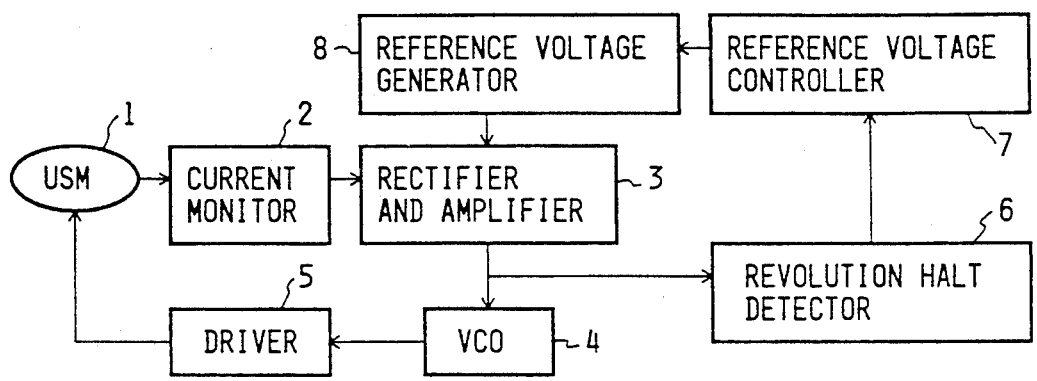
FIG. 1 is a functional block diagram showing a typical embodiment of this invention.

FIG. 1 shows a functional block diagram of a typical embodiment of the present invention.

Figure 2:
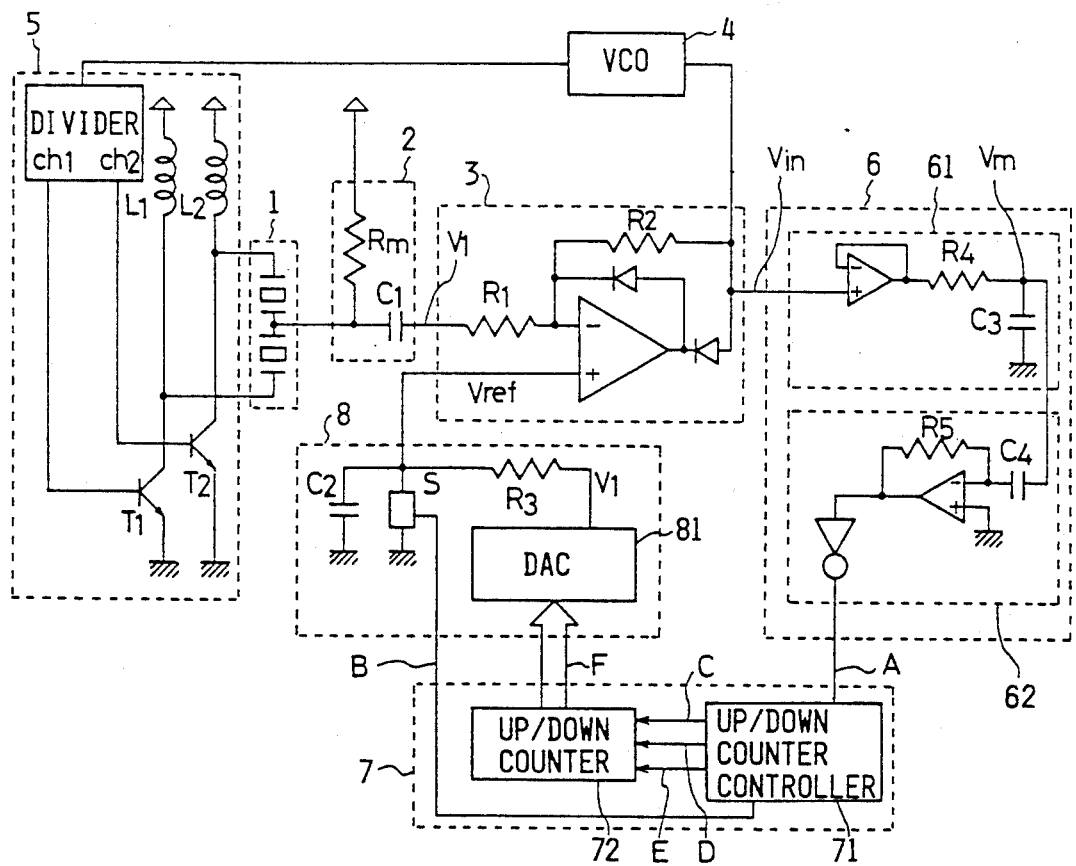
FIG. 2 is a circuit diagram showing a concrete example of the invention.

The principle by which the driving circuit of this invention stably operates the ultrasonic motor will be explained by referring to FIG. 2, which shows an ultrasonic motor 1, a current monitor 2, a rectifier and amplifier 3, a voltage-controlled oscillator (VCO) 4, a driver 5, and a reference voltage generator 8. The output frequency of VCO 4 that varies in response to a control voltage may have either a positive or negative inclination. Here we assume a negative inclination for the output frequency.

Figure 3:
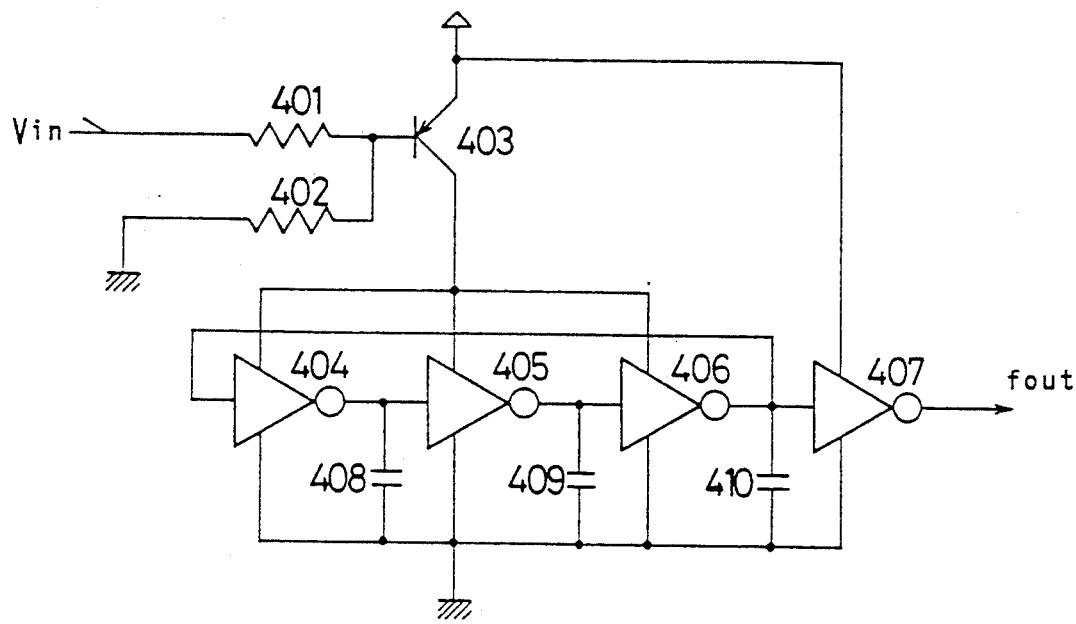
FIG. 3 is a circuit diagram showing one example of a voltage-controlled oscillator (VCO) used in this invention.
Figure 4:
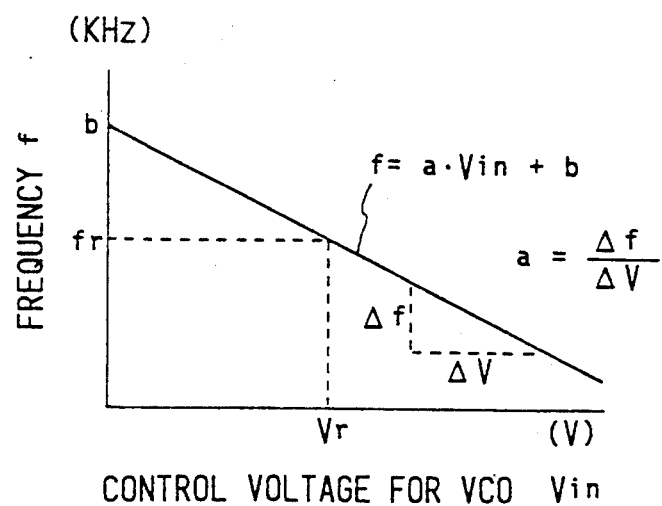
FIG. 4 is an output characteristic of the VCO of FIG. 3.
Figure 5:
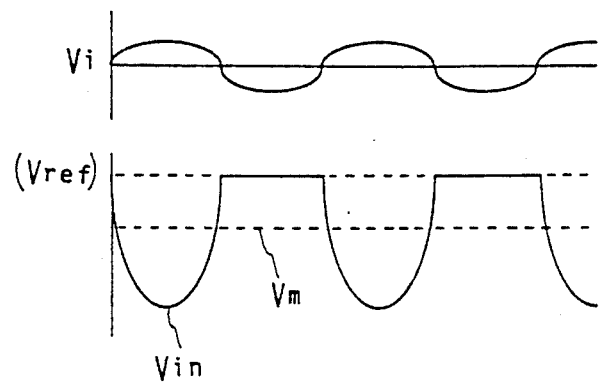
FIG. 5A is an output signal waveform of the VCO, and frequency divided waveforms of the VCO output signal.
FIG. 5B is a wave form diagram of $V_i$ and $V_{ref}$.
Figure 5:
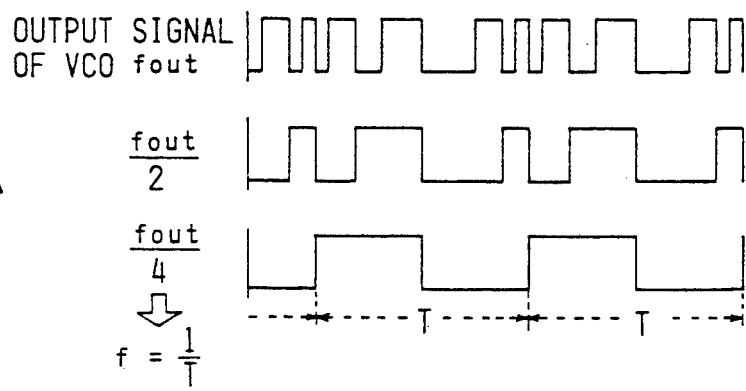

FIGS. 3 and 4 show an example circuit of the VCO and an output characteristic of VCO, respectively. The output characteristic of VCO, when approximated with a linear equation, can be expressed by equation (1).

$$f = a \times V_{in} + b \tag{1}$$

where
f = frequency of a signal which is obtained by frequency-dividing the output signal of VCO 4 and which is to be applied to the ultrasonic motor 1;
$V_{in}$ = control voltage for VCO;
a = inclination coefficient
b = offset frequency Let the control voltage for $f = f_r$ be $V_r$. The current i of the ultrasonic motor 1 is converted into a voltage signal $V_i$ by a resistor $R_m$ in the current monitor 2. The signal $V_i$ representing the current waveform is then supplied through a coupling capacitor C1 to the rectifier and amplifier 3. The rectifier and amplifier 3 performs rectification and amplification on the current waveform signal according to a reference voltage $V_{ref}$. The rectified and amplified signal $V_{in}$ is then entered into VCO 4 as a control voltage. $V_{in}$ can be expressed as $$V_{in} = V_{ref} - A_n \times i \times R_m \tag{2}$$

where $A_n$ is an amplification factor of the amplifier. When the rectified and amplified ac signal $V_{in}$ is supplied to VCO 4, the output frequency of VCO 4 changes with $V_{in}$ within each cycle of $V_{in}$. But, after the output frequency is divided into ¼, the resulting frequency f becomes constant. This is illustrated in FIGS. 5A and 5B. Instead of using the ac signal $V_{in}$, a signal $V_m$ which is $V_{in}$ smoothed out may be supplied without changing the divided frequency f. The following description uses $V_m$ for the control voltage of VCO. $V_m$ can be expressed as $$V_m = V_{ref} - A_n \times i \times R_m/\pi \tag{3}$$

Substituting equation (3) into equation (1) yields $$f = a(V_{ref} - A_n \times i \times R_m/\pi) + b \tag{4}$$

Figure 6:
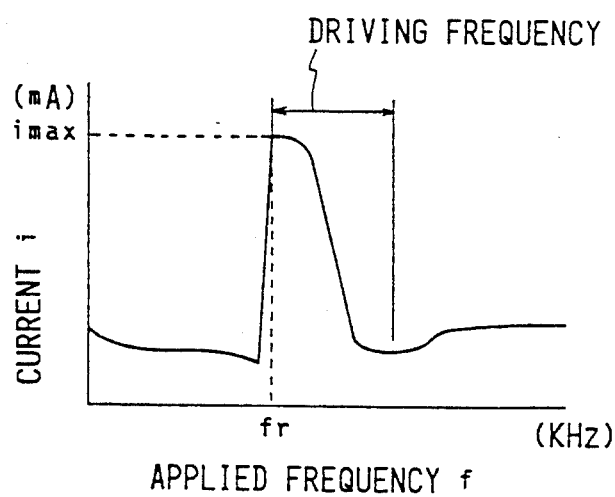
FIG. 6 is a diagram showing the relationship between a drive frequency for the ultrasonic motor and a current consumption.

When a switch S in reference voltage generator 8 changes from ON to OFF state, the reference voltage $V_{ref}$ for rectification and amplification starts to rise up to $V_1$ with a time constant of $R_3$ and $C_2$. The relationship between the applied frequency f and the current i of the ultrasonic motor 1 is shown in FIG. 6.

The instant the switch S turns off, the reference voltage $V_{ref}$ is at 0V and f is sufficiently higher than $f_r$, so that the current i is very small and $V_m$ of equation (4) can be expressed as $V_m = V_{ref}$. In other words, immediately after the switch S is turned off. $V_m$ approaches $V_r$ as $V_{ref}$ increases. f also approaches $f_r$ and at the same time the current i increases as shown in FIG. 7. As the current i increases, it is seen from equation (4) that $V_m$ is $A_n \times i \times R_m/\pi$ smaller than $V_{ref}$. Now, if we let the maximum current of the ultrasonic motor be $i_{max}$, then the maximum value of the current feedback term is $A_n \times i_{max} \times R_m/\pi$. $V_1$ is set so as to meet the condition of equation (5).

$$V_r < V_1 \leq V_r + A_n \times i_{max} \times R_m/\pi \tag{5}$$

Once $V_1$ is set as defined by equation (5), when $V_{ref}$ reaches the final voltage $V_1$, $V_m$ will settle to a voltage lower than $V_r$. Therefore, the frequency f applied to the ultrasonic motor 1 will stabilize at a frequency higher than the resonance frequency $f_r$, allowing the ultrasonic motor to be driven. FIG. 7 shows how $V_{ref}$ and $V_m$ behave after the switch S has changed from ON to OFF state.

Conversely, if the reference voltage $V_{ref}$ for rectification and amplification (= $V_1$) has a relationship as defined by equation (6), the ultrasonic motor will stop. This is because when the switch S is switched from ON to OFF state to sweep the drive frequency from a higher-than-$f_r$ frequency to a lower frequency, the final drive frequency f will settle to a frequency lower than $f_r$. This will stop the motor.

$$V_1 > V_r - A_n \times i_{max} \times R_m/\pi \tag{6}$$

An explained so far, by setting $V_1$, a reference voltage for rectification and amplification of the current waveform signal, to an appropriate value, it is possible to stabilize the output frequency of VCO at a frequency somewhat higher than $f_r$ and therefore operate the ultrasonic motor.

Now, the main operation of this invention will be described by referring to FIG. 2. The operation of this invention may be put in plain words as follows: the drive frequency is swept from the higher-than-$f_r$ frequency down to a lower one; when the ultrasonic motor stops its rotation, the process of changing the reference voltage for rectification and amplification and then lowering the drive frequency is repeated until the condition of equation (5) is satisfied. Now the details will follow.

A rotation halt detector 6 is a circuit to detect when the ultrasonic motor has stopped. A smoothing circuit 61 receives at a voltage follower the current waveform signal $V_{in}$, which was rectified and amplified by the rectifier and amplifier 3, and then smoothes it by a resistor R4 and a capacitor C3. The smoothed signal $V_m$ is differentiated by a differentiator 62. The differentiator 62 produces a pulse signal when there is a sharp change in $V_m$.

As shown in FIGS. 7A-C, when the ultrasonic motor stops the $V_m$ will show a sharp change, so that it is possible to detect the stoppage of the ultrasonic motor from the output signal of the differentiator 62. FIGS. 8A and 8B show a change in $V_m$ when the ultrasonic motor stops, and the corresponding output signal from the rotation halt detector 6. The output signal of the rotation halt detector 6 is taken as A.

Figure 13:
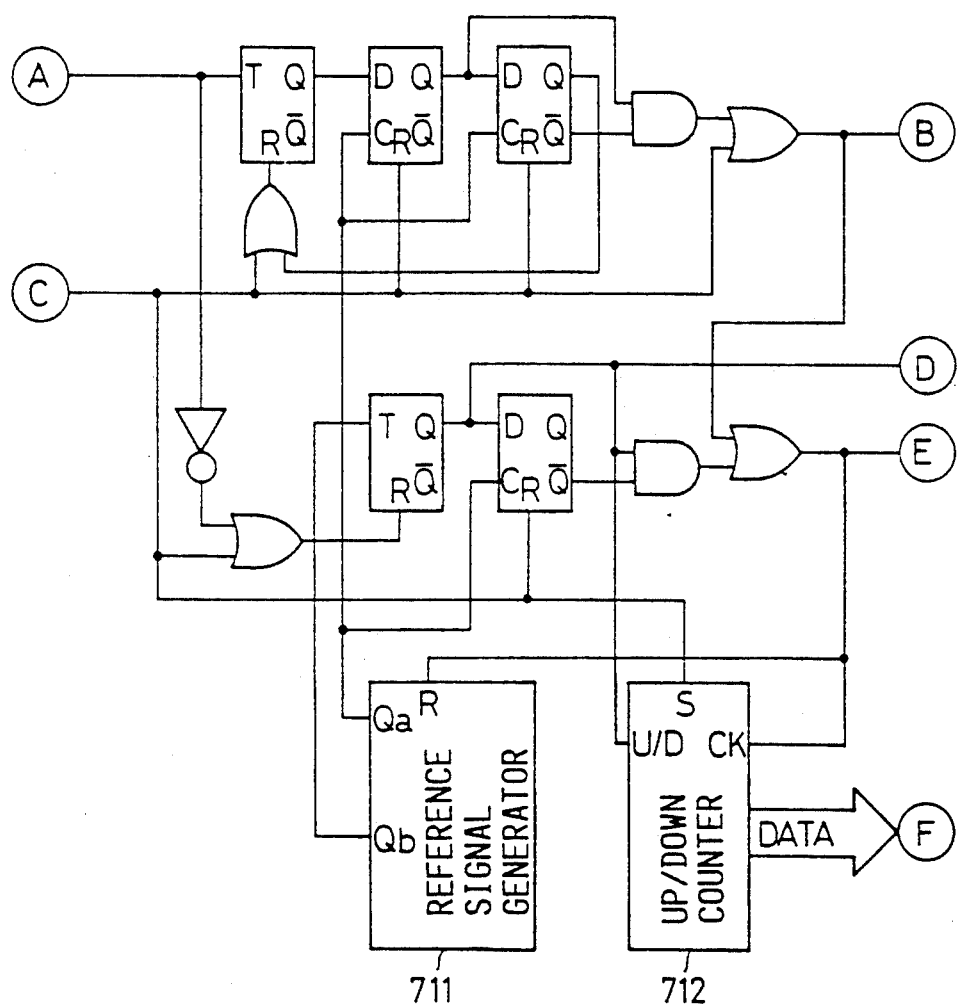
FIG. 13 is circuit diagram showing one example of an up/down counter controller 71 in the reference voltage controller 7.

A reference voltage controller 7 receives the rotation halt detection signal A to generate data F that is used to change the reference signal $V_1$ for rectification and amplification. FIG. 13 shows an example circuit of an up/down counter controller 71 in reference voltage controller 7, and FIGS. 14A and 14B are timing diagrams showing the operation of the circuit of FIG. 13. FIG. 12 illustrates an example circuit of a digital-analog converter that receives the date F generated by the reference voltage controller 7 and produces the corresponding reference voltage $V_1$.

In FIGS. 13 and 14, a signal C is a motor drive enable signal which cancels resetting of flip-flops and performs an initial setting on the up/down counter 712. The up/down counter then has its all data changed to logical 1, making the output signal $V_1$ of the reference voltage generator 8 the maximum value. This is represented by an operating region I in FIG. 14A.

When the signal C changes from 1 to 0, the reference voltage for rectification and amplification $V_{ref}$ slowly increases from 0 V to $V_1$. If we assume that the condition of equation (6) is not met because $V_1$ is now set at the maximum, the ultrasonic motor rotation halt detection signal A will be output when $V_{ref} - A_n \times i \times R_m/\pi$ becomes higher than $V_r$. With the signal A applied to the up/down counter controller 71, a subtract signal E is fed to the up/down counter 712 to subtract 1 from the data F. So the $V_1$ data becomes small according to the data F. At the same time, a control signal B for the switch S is also generated, causing the switch S to be turned on, discharging the capacitor C2. Therefore, when the switch S turns off, $V_{ref}$ gradually changes from 0 V to $V_1$ again. Furthermore, when the motor rotation halt detection signal A is produced again, the above process is repeated until the condition of equation (5) is satisfied. This operation is represented by the region II of FIG. 14A.

If the ultrasonic motor stoppage does not occur for a predetermined period of time, an add/subtract control signal D for the up/down counter 712 becomes logical 1, adding 1 to the data F of the up/down counter 712. The voltage $V_1$ goes higher accordingly. At this time the switch S does not come into the ON state. This operation is represented by the region III in FIG. 14A.

FIG. 15 shows one example circuit of a reference signal generator 711. In this example, when there is no halt detected for the period of 128 seconds, a half cycle of 1/256 Hz, the operation of region III is carried out. As the data F of the up/down counter 712 is counted up to increase $V_1$ and when the condition of equation (5) again fails to hold resulting in the motor rotation halt detection signal A being produced, the add/subtract signal D is rendered to be logical 0, that is, the up/down counter 712 is made to work as a subtract counter, repeating the operation from region II. This process of repeating the operation region of II is represented by a region IV.

Figure 9:
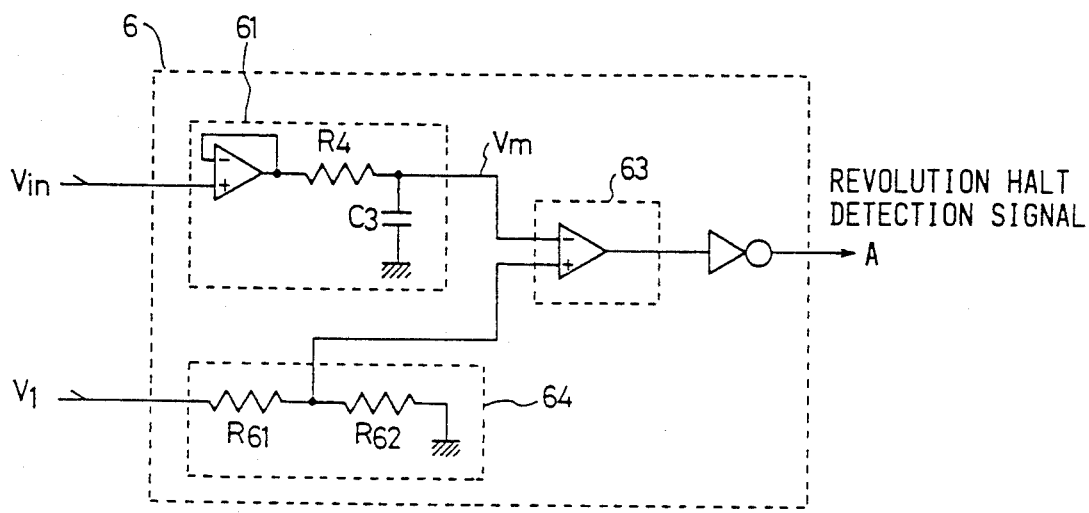
FIG. 9 is a circuit diagram showing another embodiment of the rotation halt detector 6.
Figure 10:
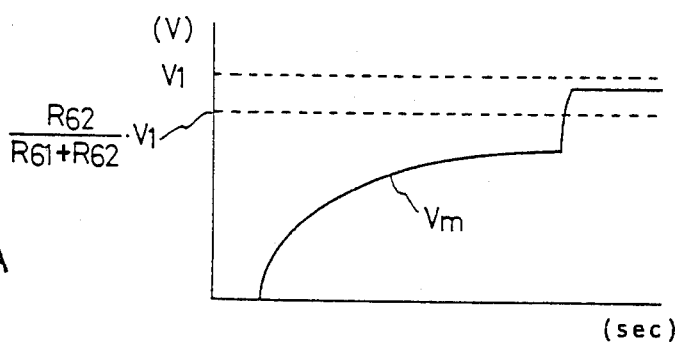
FIG. 10A is a diagram of the control voltage $V_m$.
FIG. 10B is a diagram showing a rotation halt detection signal A generated by the rotation halt detector of FIG. 9.
Figure 10:
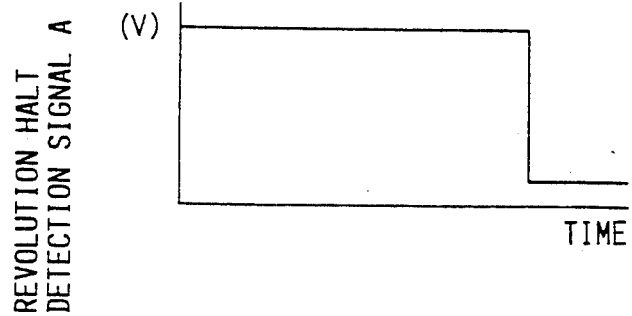

FIG. 9 is another example circuit showing the means for detecting a rotation halt of the ultrasonic motor. FIGS. 10A and 10B also show an action of the rotation halt of the ultrasonic motor which occur in FIG. 9. Smoothing means 61 smoothes out the rectifying and amplifying output signal $V_{in}$ with rectifying and amplifying means 3. The comparison circuit 63 compares a smoothed out output signal $V_{in}$ with a voltage in which the reference voltage $V_1$ in the rectifying and amplifying portion is divided by the resistances R61 and R62. High level rotation halt signal A is outputted when the ultrasonic motor is rotated and a low level rotation halt signal A is outputted when the ultrasonic motor is halted. The rotation halt of the ultrasonic motor can be known by observing the signal A.

The traveling wave type ultrasonic motor is driven by inputting two-phase signals having a 90° difference between each phase. This signal is outputted by the dividing means in the driver 5 shown in FIG. 1. FIG. 11 shows an example of the dividing means. The output signals Ch1 and Ch2 are outputted from two flip-flop circuits to the driver 5.

With this invention, in starting the ultrasonic motor, the circuit constant (reference voltage for the rectifier and amplifier) is automatically adjusted so that the ultrasonic motor can be operated. The only requirement for this is to set the output frequency range of the VCO in such a manner that it will cover the range of $f_r$ variation caused by variations in temperature, drive voltage and load.

With this invention, even when the circuit for driving the ultrasonic motor is rendered inoperable by variations in temperature, drive voltage or load during the operation of the ultrasonic motor, the constant of the drive circuit is automatically adjusted to an optimum value in accordance with these variations, allowing the ultrasonic motor to be driven again.

What is claimed is:

1. An ultrasonic motor comprising:
   current detecting means for detecting a current flowing through piezoelectric elements;
   amplifying means for amplifying an output signal of said current detecting means;
   voltage-controlled oscillating means whose output frequency changes according to an output signal of said amplifying means;
   drive means for generating, from an output signal of said voltage-controlled oscillating means, a signal to be applied to the piezoelectric elements;
   reference voltage generating means for generating an amplification reference signal for said amplifying means;
   rotation halt detecting means for detecting when the ultrasonic motor rotation has stopped, said rotation halt detecting means comprising smoothing means for smoothing out the output signal of the amplifying means, and differentiating means for differentiating the output signal of the smoothing means; and
   reference voltage control means for controlling said reference voltage generating means according to an output signal received from said rotation halt detecting means.

2. An ultrasonic motor as claimed in claim 1, wherein said amplifying means is a rectifying and amplifying means which amplifies an input signal on one side of the reference signal generated by said reference voltage generating means.

3. An ultrasonic motor as claimed in claim 1, wherein said rotation halt detecting means has a comparing means for comparing the output signal of the smoothing means with a second reference voltage which is obtained by frequency-dividing the reference signal of said reference voltage generating means.

4. An ultrasonic motor as claimed in claim 1, wherein said reference voltage control means consists of an up/down counter for a plurality of bits; and an up/down counter control means to generate an addition/subtraction control signal and also a count signal for the up/down counter according to the output signal of the rotation halt detecting means received.

5. An ultrasonic motor as claimed in claim 4, wherein said reference voltage generating means consists of a digital-analog converter whose output voltage is controlled by the count data of the up/down counter; a resistive element connected between an output terminal of the digital-analog converter and one end of the rectifying and amplifying means; and a capacitive element and a switching element connected in parallel with each other between the one end of the rectifying and amplifying means and the ground.

6. An ultrasonic motor comprising:
drive means including piezoelectric elements and means for applying a signal to the piezoelectric elements;
means for detecting current flowing through the piezoelectric elements to produce a detection signal corresponding thereto;
amplifying means receptive of the detection signal from the detecting means and a reference signal to produce an amplified signal corresponding thereto;
voltage-controlled oscillating means receptive of the amplified signal for producing an output signal having a frequency which varies with changes in the amplified signal from the amplifying means;
means for generating a reference signal and for applying same to the amplifying means;
means receptive of the amplified signal for detecting when the motor has stopped rotating, said means comprising means for smoothing the amplified signal and means for differentiating the smoothed signal; and means responsive to the differentiated smoothed signal for controlling the reference signal generating means to adjust the reference voltage to a value to effect rotation of the ultrasonic motor.

7. An ultrasonic motor according to claim 6, wherein the amplifying means includes means for rectifying the detection signal and the reference signal.

8. An ultrasonic motor according to claim 6, further comprising means for frequency dividing the first-mentioned reference signal to produce a second reference signal, and wherein the means for detecting when the motor has stopped rotating includes means for comparing the smoothed signal and the second reference signal.

9. An ultrasonic motor according to claim 6, wherein the means for controlling the reference signal generating means comprises a multi-bit up/down counter, and means for controlling the counter to produce a control signal and a count signal from the differentiated smoothed signal.

10. An ultrasonic motor according to claim 9, wherein the reference signal generating means comprises a digital to analog converter receptive of the count signal from the counter, a resistive element connected between the converter and an input to the amplifying means, and a capacitive element and a switching element connected in parallel between ground and the input to the amplifying means.

* * * * *